Feb. 15, 1938. A. D. EITZEN 2,108,055
OPTICAL SYSTEM
Original Filed Jan. 2, 1934   3 Sheets—Sheet 1
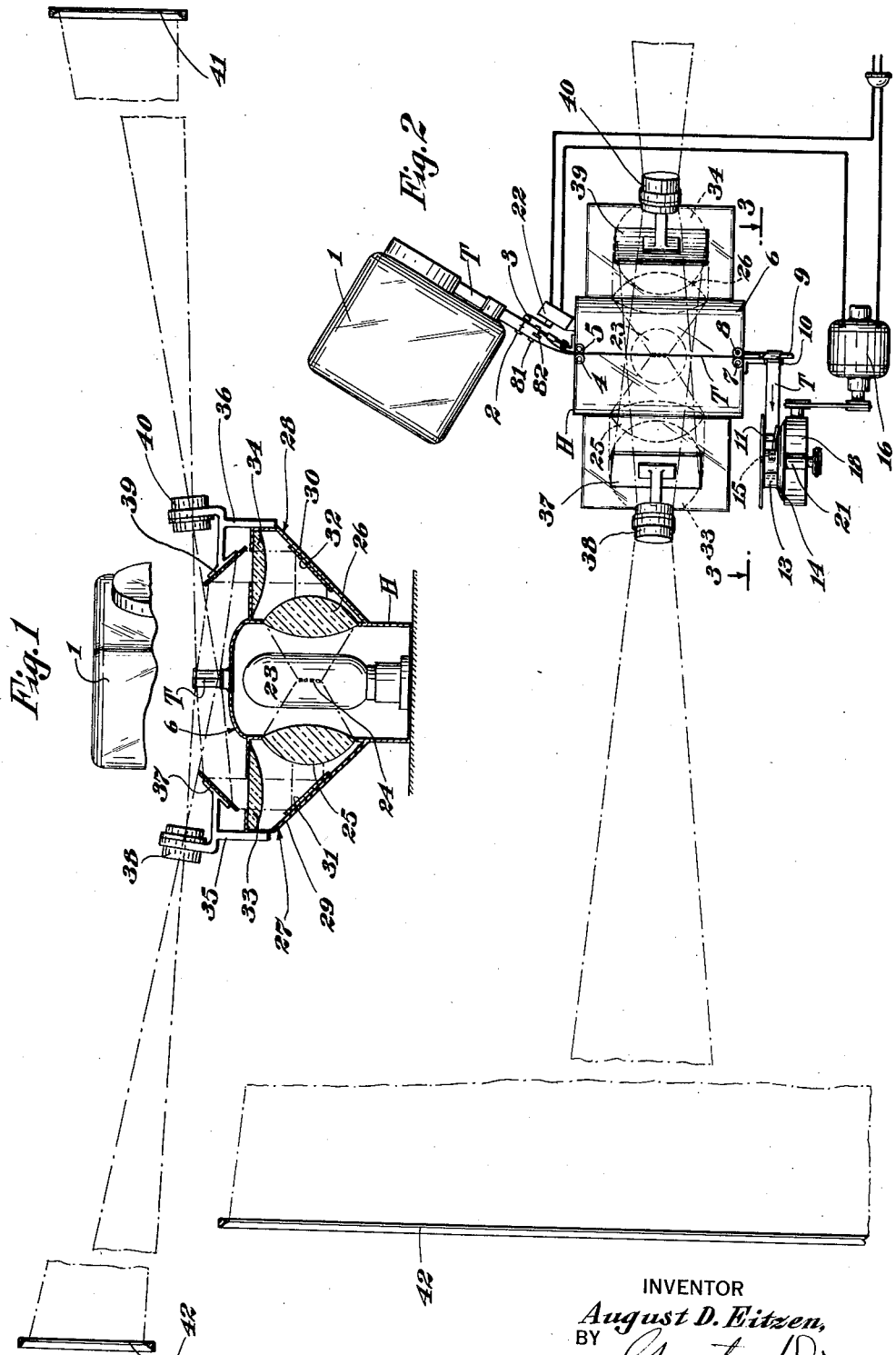
INVENTOR
August D. Eitzen,
BY Gustav Drews
ATTORNEY Feb. 15, 1938.  A. D. EITZEN  2,108,055
OPTICAL SYSTEM
Original Filed Jan. 2, 1934  3 Sheets-Sheet 2
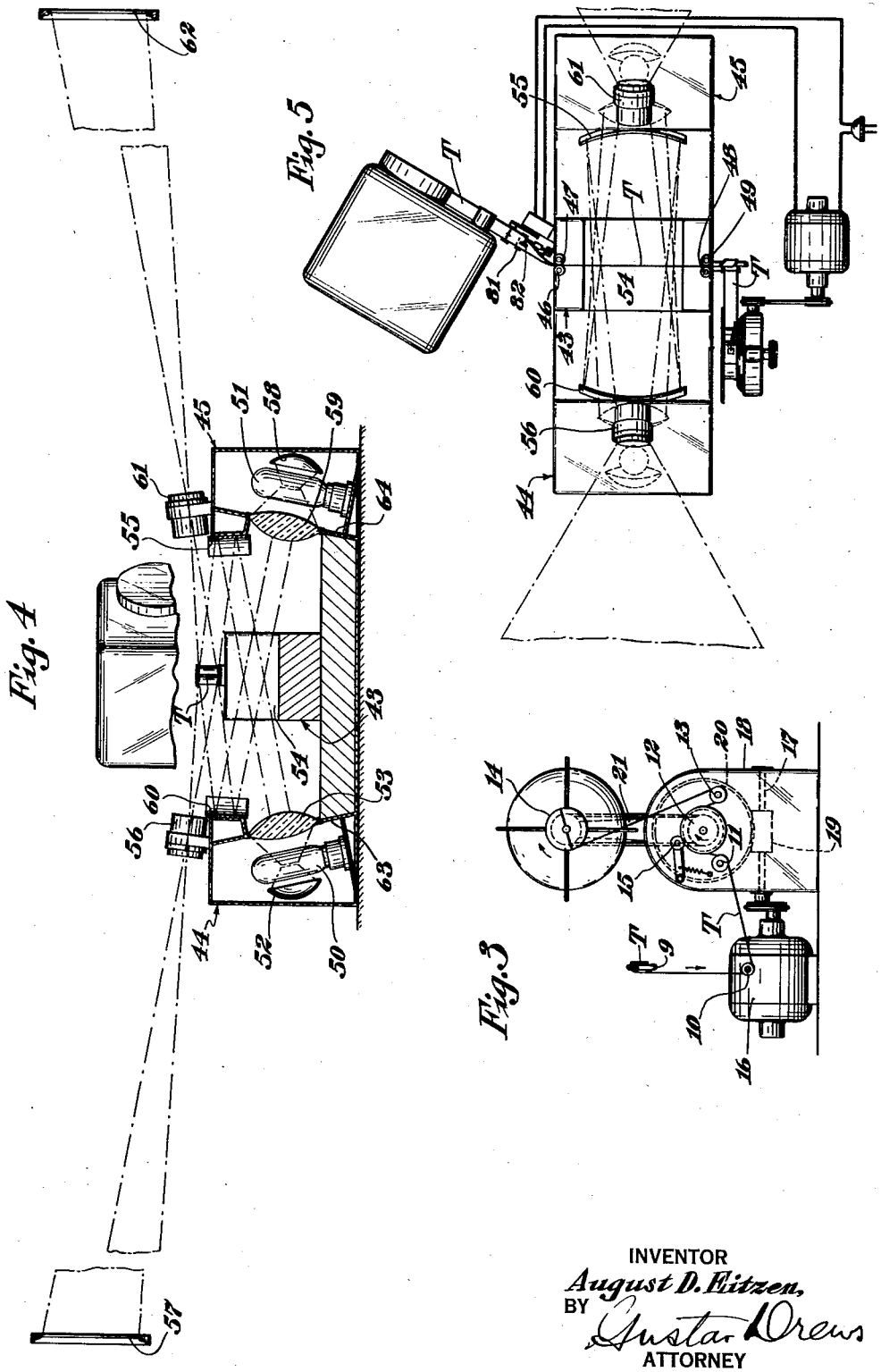
INVENTOR
August D. Eitzen,
BY Gustav Drews
ATTORNEY

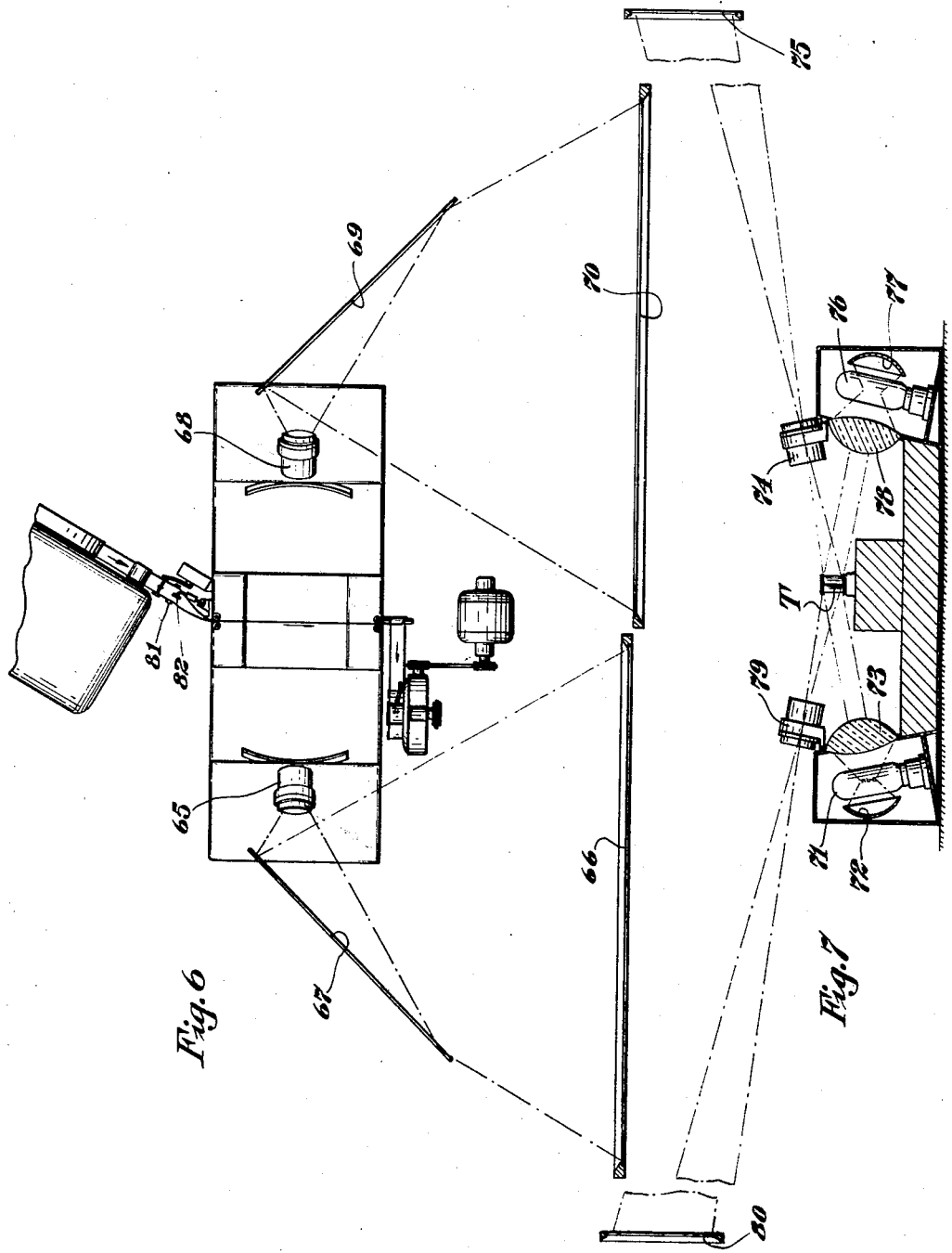

Patented Feb. 15, 1938

2,108,055

UNITED STATES PATENT OFFICE 2,108,055

OPTICAL SYSTEM

August D. Eitzen, Rockville Centre, N. Y., assignor to News Projection Corporation, New York, N. Y., a corporation of New York Application January 2, 1934, Serial No. 704,847
Renewed September 19, 1936

20 Claims. (Cl. 88—24)

This invention relates to optical systems in general and more especially to optical systems for use with stock quotation projection machines.

Among the objects of the present invention, it is aimed to provide an optical system in which a translucent or transparent tape is used as the master for at least two projected pictures by means of opposing beams of light passing through such tape from opposite sides thereof.

It is still another object of the present invention to provide an improved optical system in which tape, film or the like is being advanced through a vertical plane and at least two beams of light are directed through opposite sides of said tape, film or the like to produce image impressed light beams ultimately to appear on screens as pictures of the markings or the like on the tape, film or the like.

It is still another object of the present invention to provide an improved optical system in which a wide beam of light is formed and a concave mirror used to intercept said wide beam of light and direct it through an extended area of transparent marked tape to form a long image impressed light beam, and a screen used for receiving said image impressed light beam.

These and other features, capabilities and advantages of the invention will appear from the subjoined detail description of specific embodiments thereof illustrated in the accompanying drawings in which—

Figure 1 is a fragmental end elevation partly in section of one embodiment of the present invention;

Fig. 2 is a fragmental plan of the embodiment illustrated in Fig. 1;

Fig. 3 is a fragmental front elevation of the tape drawing mechanism of the embodiment illustrated in Fig. 1 taken on the line 3—3 of Fig. 2;

Fig. 4 is a fragmental end elevation partly in section of a second embodiment of the present invention;

Fig. 5 is a fragmental plan of the embodiment illustrated in Fig. 4;

Fig. 6 is a fragmental plan of a third embodiment of the present invention; and

Fig. 7 is a fragmental end elevation of a fourth embodiment of the present invention.

In the embodiment illustrated in Figs. 1, 2 and 3, tape T is discharged by the ticker 1 and after passing under the finger or roller 2 of the switch arm 3 it is twisted to move into a vertical plane and then passes to and between the two guide rollers 4 and 5 at one side of the top 6 of the lamp housing H and then across the top of the lamp housing H to and between the rollers 7 and 8 on the other side of the lamp housing H, the rollers 4, 5, 7 and 8 being mounted upon vertically extending axes in the present instance.

From the rollers 7 and 8, the tape T passes to and across the angle plate 9 extending from the side of the housing H and then passes down to the idler 10, see Fig. 3, and from there to the idler 11, then over the tape pulling roller 12 and then under the idler 13 and up to and onto the rewind reel 14.

The tape T is maintained in pulling engagement with the roller 12 by the pressure roller 15. The idler 10 in the present instance is journaled on the side of the lamp housing H. Below the angle plate 9, a motor 16 is provided in the present instance which is drivingly connected in the usual way with the shaft 17 journaled in the housing 18 on which is mounted the worm 19 in mesh with the worm wheel 20 which is in the present instance mounted on the shaft of the tape pulling roller 12. The rewind reel 14 is journaled in the bracket 21 extending upwardly from the housing 18.

The motor 16 is electrically connected to the electric switch in the switch box 22 which is controlled by the switch arm 3 in the usual way, that is when the ticker 1 operates a deflection will be formed in the tape T to deflect the arm 3 into circuit making position and when the ticker stops and the tape puller continues to operate, by dissipating the deflection in the tape it will in turn deflect the arm 3 into circuit breaking position.

In the housing H, there is mounted a lamp 23, the filament 24 of which is disposed to aline with the convexo-convex lenses 25 and 26 mounted in the present instance in openings formed in opposite side walls of the housing H.

Outwardly of the lenses 25 and 26, there are formed the extensions 27 and 28 respectively. These extensions have bases 29 and 30 respectively inclined at about forty-five degrees to the vertical and provided with the deflectors or mirrors 31 and 32 respectively to receive the light rays from the lenses 25 and 26 and direct them upwardly through the condensers 33 and 34 respectively formed at the upper ends of the extensions 27 and 28 respectively. The upper outer edges of the extensions 27 and 28 are provided with the brackets 35 and 36 respectively. The bracket 35 is provided with a deflector or mirror 37 and an objective lens unit 38 and the bracket 36 is similarly provided with a deflector or mirror and an objective lens unit, the mirror being designated 39 and the objective lens unit being designated 40.

The light rays directed upwardly through the condenser 33 are intercepted by the mirror 37 and then directed through the tape T to produce an image impressed light beam which then passes through the objective lens unit 40 and onto the front projection screen 41. The light rays passing up through the condenser 34 are intercepted by the mirror 39 and directed through the tape T to produce an image impressed light beam which then passes through the objective lens unit 38 and ultimately appears on the rear face of the rear projection screen 42.

In the present instance, it will be apparent that the printed matter on the tape reads longitudinally thereof and after leaving the ticker 1 is twisted so that its upper edge is at the bottom. It will also appear that the mirror 37 is disposed to clear the path of the light beam from the tape T to the objective lens unit 38 and in turn that the mirror 39 is disposed to clear the path of the light beam from the tape T to the objective lens unit 40.

In the present instance, the light rays collected by the lenses 25 and 26 respectively are directed in opposite horizontal directions and then deflected by the mirrors 31 and 32 in substantially vertical directions and then deflected by the mirrors 37 and 39 in directions that are inclined to the vertical so that the light beams from the mirrors 37 and 39 may pass through the tape T in opposite directions and yet clear one another when passing to and through the objective lens units 38 and 40.

In the embodiment illustrated in Figs. 4 and 5, the tape feed is substantially identical to that illustrated in Fig. 1 except that the guide rollers for supporting the tape T in the imaginary light aperture are mounted on the top of an intermediate housing 43 disposed between two lamp housings 44 and 45, the rollers 46 and 47 being mounted at the entrance end of the light aperture on one side of the top of the housing 43 and the rollers 48 and 49 being mounted on the opposite side of the top of the housing 43. The rollers 46, 47, 48 and 49 in the present instance are also mounted on vertical axes.

In the lamp housings 44 and 45, there are mounted the lamps 50 and 51 which are preferably inclined from the vertical. In the present instance, similar to the embodiment illustrated in Fig. 1, the light rays are directed through the tape T from opposite sides thereof but instead of a common source of light, there are here provided two sources of light, to wit the lamps 50 and 51.

The light rays from the lamp 50 cooperate with the reflector 52 and convexo-convex lens unit 53 to pass through the chamber 54 of the intermediate housing 43, strike the curved mirror or reflector 55 to be deflected through the tape T and pass through the objective lens unit 56 onto the rear face of the rear projection screen 57 ultimately to appear in an upright readable position on the front face of the screen 57.

The light rays from the lamp 51 on the other hand cooperate with the reflector 58 and convexo-convex lens unit 59 to pass through the chamber 54 onto the curved mirror or deflector 60, then through the tape T, emerge as an image impressed light cone and then pass through the objective lens unit 61 onto the front face of the front projection screen 62.

The reflector 52 is in the present instance mounted in the lamp housing 44 and the convexo-convex lens unit 53 mounted at an incline to the vertical in the opening formed in the inclined wall 63 of the lamp housing 44. Preferably at the upper inner end of the lamp housing 44, there are mounted both the curved mirror 60 and objective lens unit 56, in the present instance, the mirror 60 being mounted below the lower level of the light cone being deflected by the mirror 55 through the tape T toward the objective lens unit 56.

Similarly the reflector 58 is mounted in the lamp housing 45, the convexo-convex lens unit 59 mounted at an incline to the vertical in the opening formed in the inclined wall 64 of the lamp housing 45, and the mirror 55 and objective lens unit 61 mounted at the upper inner end of the lamp housing 45, the mirror 55 being mounted below the lower level of the light cone deflected by the mirror 60 through the tape T toward the objective lens unit 61.

Similar to the embodiment illustrated in Fig. 1, the tape T in the embodiment of Fig. 4 after leaving the ticker is twisted to pass in a vertical direction with its upper edge at the bottom.

The embodiment illustrated in Fig. 6 differs from the embodiment illustrated in Fig. 4 primarily in interposing a mirror between each objective lens unit and its screen. As an instance, between the objective lens unit 65 positioned similar to the objective lens unit 56 and the screen 66, there is interposed the deflector 67 as a result of which the image impressed light beam passing through the objective lens unit 65 is intercepted by the mirror 67 and deflected onto the front face of the front projection screen 66. The objective lens unit 68 on the other hand positioned similar to the objective lens unit 61 of the embodiment illustrated in Fig. 4 directs its image impressed light cone onto the mirror 69 which directs it onto the rear face of the rear projection screen 70 ultimately to appear in upright readable position on the front face of the screen 70.

The embodiment more or less diagrammatically illustrated in Fig. 7, differs primarily from the embodiment illustrated in Fig. 4 by omitting the curved mirrors 55 and 60, the light rays from the lamp 71 cooperating with the reflector 72 and convexo-convex lens unit 73 to pass directly through the tape T and then through the objective lens unit 74 onto the front face of the front projection screen 75.

The light rays from the lamp 76 on the other hand cooperate with the reflector 77 and convexo-convex lens unit 78 to pass from the other side of the tape T through the tape T to emerge as an image impressed light cone and then pass through the objective lens unit 79 onto the rear face of the rear projection screen 80 ultimately to appear in upright readable position on the front face of the screen 80.

It is also obvious with the embodiment illustrated in Fig. 4 that an optical system including the elongated concave mirror 55 permits the interception of a wide beam of light and the direction of same through an elongated length of marked tape. The concave mirror 55 may of course be considerably elongated as compared to the diameter of a condensing lens without in any way interfering with its efficiency.

By means of the combination including the concave mirror 55 of the embodiment illustrated in Fig. 4, it will be obvious that the desired converging cone of light may be properly produced without the use of thick condensers of large diameters with their resulting disadvantages and limitations for short foci work and for extended tape aperture areas.

In order to insure properly twisting the tape when passing from the ticker to the light aperture, there is provided for each embodiment aforesaid, a helical guide plate 81 in engagement with which the tape is maintained by the weighted finger 82.

In the claims, it will be obvious that the term "beam" when referring to a collection of light rays is intended to cover not only a collection of parallel light rays but also a collection of diverging as well as converging light rays.

It is obvious that various changes and modifications may be made to the details of construction without departing from the general spirit of the invention as set forth in the appended claims.

I claim:

1. In an optical system, the combination with a translucent or transparent master, of means for directing a plurality of light beams at opposite faces of a common area of said master to produce a plurality of image impressed light cones emerging from both faces of said master, and screens for receiving the image impressed light cones so produced.

2. In an optical system, the combination with a transparent or translucent master, of means for directing a plurality of light beams at both faces of a common area of said master to produce a plurality of image impressed light cones emerging from both faces of said master, screens, and an objective lens unit for each image impressed light cone to intercept and direct the same at one of said screens.

3. In an optical system, the combination with a transparent ribbon ticker tape having printed matter readable longitudinally thereof, of guides for supporting a portion of said tape in a vertical plane with its upper edge at the bottom, means forming and directing a plurality of light cones at opposite faces of a common area of said vertically extending portion of tape to pass therethrough to emerge as image impressed light cones, and a plurality of objective lens units, each lens unit intercepting one of said image impressed light cones and directing it at one of said screens.

4. In an optical system, the combination with a transparent ribbon ticker tape having printed matter reading longitudinally thereof, of means for supporting said tape in a vertical plane while crossing a light aperture with the upper edge of the tape at the bottom, means for forming and directing two light cones at opposite faces of a common area of the tape at the light aperture to pass therethrough to emerge as image impressed light cones, two vertically extending screens, and two objective lens units, each lens unit intercepting one of said image impressed light cones and directing it at one of said screens.

5. In an optical system, the combination with a transparent ribbon ticker tape having printed matter reading longitudinally thereof, of means for supporting said tape in a vertical plane while crossing a light aperture with the upper edge of the tape at the bottom, means for forming and directing two light cones at opposite faces of a common area of the tape at the light aperture to pass therethrough to emerge as image impressed light cones, a rear projection screen, a front projection screen, and two objective lens units, one of said lens units intercepting one of said image impressed light cones and directing it onto the rear face of said rear projection screen to produce an image of the markings of the portion of the tape at the light aperture in upright readable position on the front face of said rear projection screen and the other lens unit intercepting the other of said image impressed light cones and producing another image of the markings of the same portion of tape at the light aperture in upright readable position on the front face of said front projection screen.

6. In an optical system, the combination with a transparent tape having markings thereon, of guides for supporting a portion of said tape in a vertical plane, a common source of light, means including mirrors for directing two subordinate cones of light from said source of light at opposite faces of the vertically extending portion of said tape to produce two image impressed light cones, and screens for receiving the image impressed light cones so produced.

7. In an optical system, the combination with a transparent tape having markings thereon, of a common source of light, means including mirrors intercepting two subordinate light cones projected away from said source of light and directing them to pass through said tape from opposite faces thereof to produce two image impressed light cones, and screens for receiving the image impressed light beams so produced.

8. In an optical system, the combination with a transparent tape having markings thereon, of means including a common source of light for forming and directing two horizontally extending beams of light away from one another, means including mirrors for intercepting said horizontally directed beams of light and deflecting them to intersect one another at said tape and then continue away from one another as image impressed light beams, and screens for receiving the image impressed light beams so produced.

9. In an optical system, the combination with a transparent tape having markings thereon, of means including a common source of light for forming and directing two horizontally extending cones of light away from one another, means including mirrors for intercepting said horizontally directed cones of light and deflecting them to intersect one another at said tape and then continue away from one another as image impressed light cones, screens, and objective lens units for receiving the image impressed light cones and directing them onto said screens as upright readable images.

10. In an optical system, the combination with a transparent tape having printed matter readable longitudinally thereof, of guides for supporting a portion of said tape in a vertical plane with its upper edge at the bottom, means including a common source of light for forming and directing two horizontal cones of light in directions away from one another, means including mirrors for intercepting said horizontally extending cones of light and deflecting them to cross one another through said vertically positioned portion of tape, two screens, and two objective lens units, each lens unit intercepting one of the cones of light passing through said tape and directing it at one of said screens.

11. In an optical system, the combination with a transparent tape having printed matter readable longitudinally thereof, of guides for supporting a portion of said tape in a vertical plane with its upper edge at the bottom, means including two sources of light for forming two cones of light and directing them across one another, two mirrors for intercepting said cones of light and deflecting them to cross one another at the vertically extending tape portion to produce two image impressed light cones, and screens for receiving the image impressed light cones so produced.

12. In an optical system, the combination with a transparent tape having printed matter readable longitudinally thereof, of guides for supporting a portion of said tape in a vertical plane with its upper edge at the bottom, means including two sources of light for forming two beams of light and directing them across one another, two mirrors for intercepting said beams of light and deflecting them to cross one another at the vertically extending tape portion to produce two image impressed light beams, two screens, and two objective lens units, each lens unit intercepting one of said image impressed light beams and directing it at one of said screens.

13. In an optical system, the combination with a transparent tape having printed matter readable longitudinally thereof, of guides for supporting a portion of said tape in a vertical plane with its upper edge at the bottom, means including two sources of light for forming two beams of light and directing them across one another, two curved mirrors for intercepting said beams of light and deflecting them to cross one another at the vertically extending tape portion to produce two image impressed light beams, and screens for receiving the image impressed light beams so produced.

14. In an optical system, the combination with a transparent tape having printed matter readable longitudinally thereof, of guides for supporting a portion of said tape in a vertical plane with its upper edge at the bottom, means including two sources of light for forming two beams of light and directing them across one another, two mirrors for intercepting said beams of light and deflecting them to cross one another at the vertically extending tape portion to produce two image impressed light beams, two screens, two objective lens units, each lens unit intercepting one of said image impressed light beams and rotating the same one hundred and eighty degrees end for end, and two secondary mirrors, each secondary mirror intercepting the image impressed light beam projected by one of said lens units and directing it at one of said screens.

15. In an optical system, the combination with a transparent tape having printed matter readable longitudinally thereof, of guides for supporting a portion of said tape in a vertical plane with its upper edge at the bottom, means including two sources of light for forming and directing two beams of light to cross one another at the vertically extending tape portion to produce two image impressed light beams, two screens, and two objective lens units, each lens unit intercepting one of said image impressed light beams and directing it at one of said screens.

16. In an optical system, the combination with a transparent tape having printed matter readable longitudinally thereof, of guides for supporting a portion of said tape in a vertical plane with its upper edge at the bottom, means including a source of light for forming a wide beam of light, a cylindrical concave mirror, the altitude of which is shorter than the length of the curved line perpendicular to such altitude, for receiving said wide beam of light and directing it through said vertically extending tape portion to form an image impressed light beam contracted laterally relative to the message formed by the markings on the tape, a screen, and an objective lens unit for intercepting said image impressed light beam and diverging and directing it at said screen.

17. In an optical system, the combination with a translucent or transparent master, of means for directing a plurality of light beams at opposite faces of said master to produce a plurality of image impressed light cones emerging from both faces of said master, and screens for receiving the image impressed light cones so produced, said directing means being disposed to one side of said master to direct the light beams at an oblique angle to one another to enable the image impressed light cones to clear one another.

18. In an optical system, the combination with a translucent or transparent master, of means for directing a plurality of light beams at opposite faces of said master and to produce a plurality of image impressed light cones emerging from both faces of said master, and screens for receiving the image impressed light cones so produced, said directing means being disposed at a different level than either the level of the screens or the level of the master to direct the light beams at an oblique angle to one another to intercept one another before arriving at their respective screens.

19. In an optical system, the combination with a light transmitting master, of means including lenses for directing a plurality of light beams through a common area of said master to emerge from opposite faces of said master as a plurality of image impressed light cones, and screens for receiving the image impressed light cones so produced.

20. In an optical system, the combination with a light transmitting master, of a plurality of light sources, means including lenses for directing a plurality of light beams from said light sources through a common area of said master to emerge from opposite faces of said master as a plurality of image impressed light beams, and a screen for each of said image impressed light beams and for receiving the image impressed light beams so produced.

AUGUST D. EITZEN.